United States Patent

Anderson

[15] 3,676,636

[45] July 11, 1972

[54] ARTICLE OF MANUFACTURE AND METHOD OF MAKING THE SAME

[72] Inventor: David G. Anderson, Bloomfield Hills, Mich.

[73] Assignee: Quanta Welding Company, Troy, Mich.

[22] Filed: Oct. 29, 1970

[21] Appl. No.: 85,105

[52] U.S. Cl. .......................... 219/117 R, 219/86, 219/91, 219/107

[51] Int. Cl. ........................................ B23k 11/04

[58] Field of Search .................. 219/117 R, 91, 85, 86, 119, 219/107

[56] References Cited

UNITED STATES PATENTS

| | | | |
|---|---|---|---|
| 3,313,911 | 4/1967 | Seeloff | 219/117 X |
| 3,301,994 | 1/1967 | Seeloff | 219/117 X |
| 2,287,540 | 6/1942 | Vang | 219/117 X |
| 3,067,320 | 12/1962 | Guir | 219/91 X |
| 3,038,988 | 6/1962 | Kessler et al. | 219/117 X |
| R15,466 | 10/1922 | Murray, Jr. | 219/117 R |

*Primary Examiner*—J. V. Truhe
*Assistant Examiner*—Gale R. Peterson
*Attorney*—Wilson & Fraser

[57] ABSTRACT

An article of manufacture consisting of at least two contacting parts of electrically conductive material disposed in overlapping relation having a solid state pulse resistance weld at the faying interface between the parts interconnecting the same into an integral unitary structure. The method of producing the unitary structure involves the disposition of the parts to be welded together in overlap relation followed by a timed phased application of a force pulse and an electrical energy pulse to the assembled parts to achieve the desired structure.

6 Claims, 9 Drawing Figures

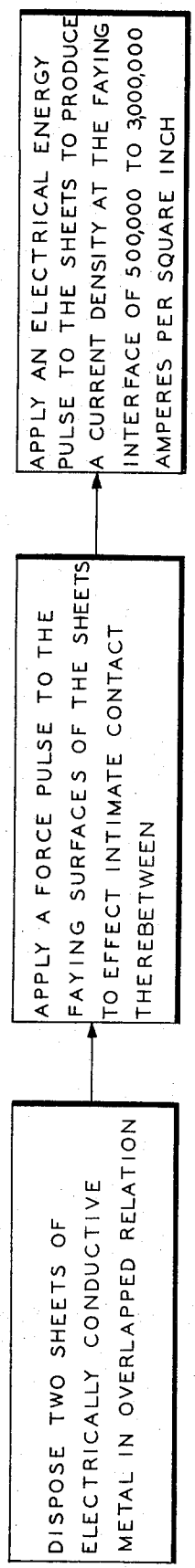
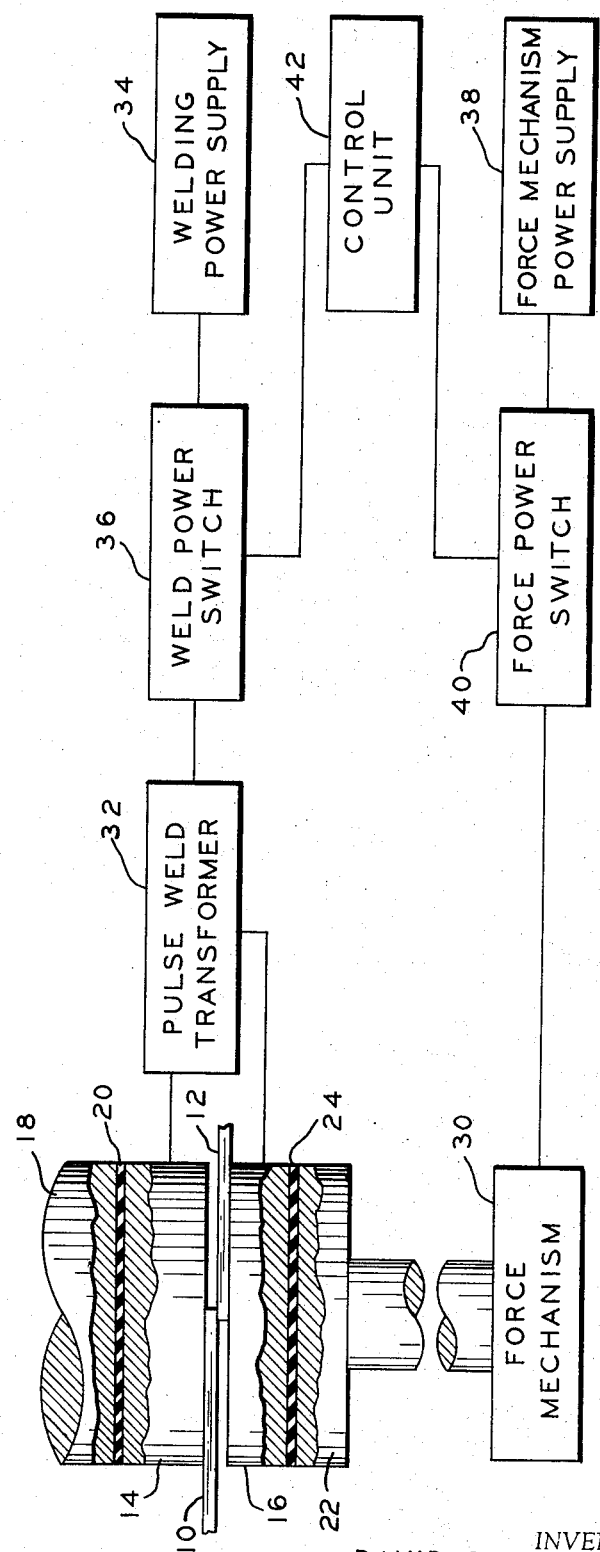

PATENTED JUL 11 1972

INVENTOR.
DAVID G. ANDERSON
BY Wilson + Fraser
ATTORNEYS 3,676,636

ARTICLE OF MANUFACTURE AND METHOD OF MAKING THE SAME

BACKGROUND OF THE INVENTION

Various attempts have been made in the prior art to weld sheets of electrically conductive material in an overlapped disposition. Such attempts have resulted in welds having substantially large zones of metal, the crystalline structure of which has been distorted to thereby effectively reduce the integrity and strength of the weld and the resultant article. The reason for the change in the crystalline structure of the metal being welded is typically occasioned by the buildup of the heat energy in the weld area during the conventional welding techniques, such as is experienced, for example, in the resistance welding field.

SUMMARY

By the utilization of the method of the invention, the problem of deformation and crystalline structure change of the metal parts being welded is considerably minimized. The objectives and advantages of the invention can be achieved by disposing two parts of electrically conductive material in a slightly overlapped relation between two associated electrodes. The electrodes, being capable of relative movement, are initially moved toward one another to effectively produce a force pulse on the metal parts at the faying interface therebetween. In time phased relation with the force pulse, the electrodes are energized to apply an electrical energy pulse to establish a current density within the range of from 500,000 to 3,000,000 amperes per square inch of weld interface, typically for an interval of time of the order of 0.5 to 5.5 milliseconds to effectively weld the parts together to form an integral unitary article.

BRIEF DESCRIPTION OF THE DRAWINGS

Other objects and advantages of the invention will become readily apparent to those skilled in the art from reading the following detailed description of an embodiment of the invention when considered in the light of the accompanying drawings in which:

FIG. 1 is a flow diagram of the method of the invention;

FIG. 2 is a schematic diagram of one form of the electrode structure and associated system which may be employed for satisfactorily effecting the desired integral structure of the invention;

DESCRIPTION OF PREFERRED EMBODIMENTS

As diagrammatically illustrated in FIG. 1, the invention is concerned with a process for bonding two parts of electrically conductive metal together to form a unitary integral article. More specifically, the invention relates to a process for producing a solid state pulse resistance bond or weld between two overlapped parts of thin walled electrically conductive metal and the resultant unitary article formed thereby. The process involves the time phased application of a force pulse and a pulse of electrically energy of a current density within the range of from 500,000 to 3,000,000 amperes of the weld or faying interface of the parts being joined.

Figure 3:
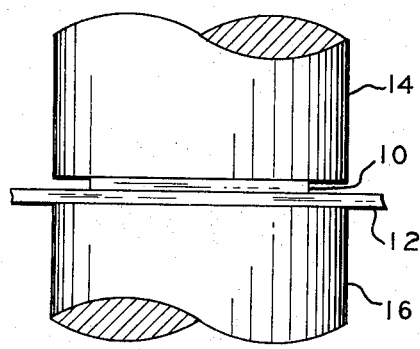
FIG. 3 is an enlarged fragmentary elevational view of the distal ends of the cooperating electrodes illustrated in FIG. 2 showing the disposition of the parts being welded and is revolved 90° from the illustration of FIG. 2.
Figure 4:
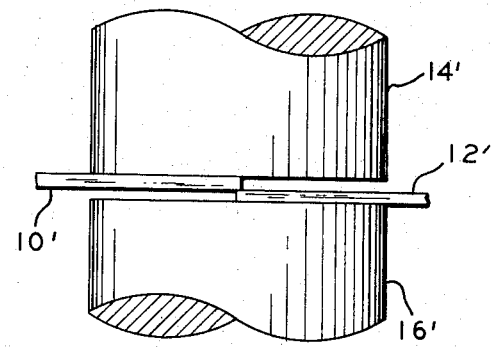
FIG. 4 is an enlarged fragmentary elevational view of the terminal portions of the cooperating electrode elements of the type illustrated in FIGS. 2 and 3 showing the before weld disposition of the parts to be welded in a modified manner from that illustrated in FIGS. 2 and 3.
Figure 5:
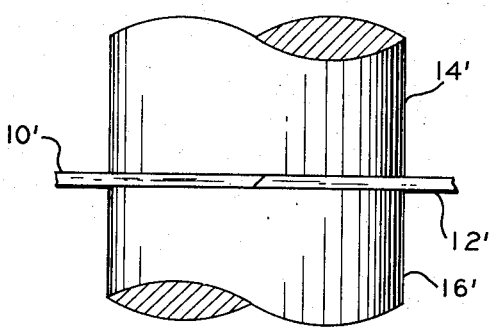
FIG. 5 is a view similar to FIG. 4 showing the parts being welded subsequent to the welding operation.

At the commencement of the process, and with particular reference to FIGS. 2 and 3, two sheets 10 and 12 of electrically conductive metal such as for example, mild steel (1010) of 0.058 inches in thickness are disposed in a manner wherein there is only a slight overlap, and the overlapped section is positioned between a pair of cooperating relatively movable electrodes 14 and 16. The uppermost electrode 14 is mounted on an upper platen or fixed support 18 electrically insulated therefrom by a layer of insulating material 20. The lowermost electrode 16 is mounted for unitary movement on a lower platen 22 and is electrically insulated therefrom by a layer of insulating material 24. The lower platen 22 is coupled to a force mechanism 30 which may provide for selective reciprocating movement of the electrode 16 relative to the electrode 14 to initially enable the disposition of the parts 10 and 12 therebetween. At such stage in the operation, the electrodes 14 and 16 are moved together until the assemblage of the parts 10 and 12 are in a relatively fixed position.

The force mechanism 30, which typically includes a pressure transducer, is effective to apply a force pulse on the lower platen 22, which is superimposed on the initial forces applied by the closing of the electrodes 14 and 16 by the relative closing movement of the associated platens 18 and 22. The specific mechanism employed for developing the force by the force mechanism 30 may be of the type illustrated and described in the United States Patent to A. G. Vang - U.S. Pat. No. 3,059,094 - issued Oct. 16, 1962. It will be understood that in a time phased relation with the application of a force pulse on the sheets 10 and 12 by the force mechanism 30, an electrical energy pulse is applied to the electrodes 14 and 16, as will be explained in greater detail hereinafter.

It has been found that in practice, pressures developed of the order of from 2,000 to 3,000 pounds have been employed to produce satisfactory solid state welds with the described process. These pressures are not considered to be critical and may be varied over a rather wide range. The pressures imposed on the system can be imposed in sinusoidal wave form, and, typically, the force pulse is initiated first and before the force pulse reaches the maximum amplitude, the electrical energy pulse is commenced. Typically, the electrical energy pulse is then allowed to fully decay before the full decay of the force pulse. The electrical energy pulse is developed in the system illustrated in FIG. 2 in the secondary winding of a pulse weld transformer 32 which has its primary winding coupled to a weld power supply 34 through a suitable weld power switch 36. The weld power supply 34 typically includes a bank of capacitors and a charging circuit which are effective to produce an instantaneous source of electrical energy to the pulse weld transformer 32 as will be explained in greater detail hereinafter.

The force mechanism 30 is coupled to a force mechanism power supply 38 through a force power switch 40.

The weld power switch 36 and the force power switch 40 are controlled in timed relation to one another by a process control unit 42. The control unit 42 is effective to energize the respective power switches 36 and 40 in such a fashion that, typically, the force power switch 40 is energized to commence the application of force by the lower platen 22 to apply a force pulse at the interface of the sheets 10 and 12. Then, the control unit 42 is effective to energize the weld power switch 36 to allow the capacitors of the weld power supply 34 to discharge and produce an electrical energy pulse in the primary winding of the pulse weld transformer 32. The secondary winding of the pulse weld transformer 32 causes a high electrical energy pulse between the electrodes 14 and 16 and the sheets 10 and 12. An electrical energy pulse having a current density of the order of from 500,000 to 3,000,000 amperes per square inch of weld interface has been satisfactory for achieving the desired results of the invention of obtaining a solid state bond. In operation of the illustrated embodiment, the force pulse peaks in the order of from 0.5 to 2.0 milliseconds before the electrical energy peaks.

It has been theorized that the phenomenon involved in the welding process of the invention involves electrical energy at the interface of the sheets 10 and 12 in magnitude sufficient to establish atomic bonds across the interface, resulting in a solid state pulse resistance weld. The electrical energy pulse applied by the pulse transformer 32 follows an electrical path through the electrode 14, the sheets 10 and 12, and the electrode 16.

The control unit 42 is typically energized after the lower platen 22 and the upper platen 18 are initially closed to a point where the sheets 10 and 12 are firmly held between terminal ends of the electrodes 14 and 16. The energized control unit 42 initially signals the force switch 40 to couple the force mechanism 30 to its power supply 38 to effectively impart a force pulse of 8.3 millisecond duration, for example, with a peak force of approximately 2,000 pounds to the platen 22, causing the sheets 10 and 12 to be bonded to be forced tightly against the adjacent overlapped surfaces.

Typically, the control unit 42 is programmed to energize the weld power switch 36 coupling the pulse transformer 32 to the welding power supply 38 to thereby apply an electrical energy pulse to the electrode elements 14 and 16. The energization thereof commences, in the described embodiment, prior to the instant the force pulse reaches its peak amplitude.

The invention has produced a novel method of producing a composite structure formed of a thin walled sheet material wherein the sheets are of a heat modifiable material and the total energy necessary to effect the bond or weld is minimal.

The temperature of the overall mass of the bonded members is raised only slightly during the bonding process, for example, 5° to 10° F., while at the interface where high electrical resistance exists, there is a small localized area of substantial thinness or surface skin which may approach melting or forging temperatures. The energy requirements are typically only 10 to 20 per cent of the magnitude of the energy requirements of conventional welding processes.

Figure 6:
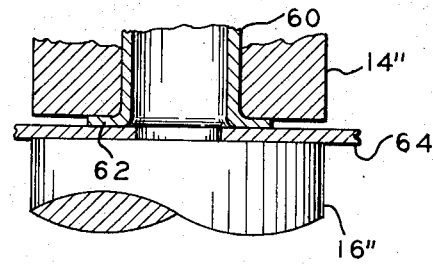
FIG. 6 is a fragmentary elevational view partly in section illustrating the method of the invention employed to weld a tube to plate wherein the parts are disposed in an overlapped relation.
Figure 7:
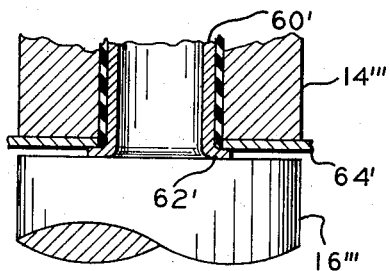
FIG. 7 is a fragmentary elevational view partly in section of apparatus similar to that illustrated in FIG. 6 wherein the plate or sheet is disposed on the upper surface of the flange portion of the tube which could be welded together to form an integral unitary article.

FIG. 7 illustrates an arrangement similar to that illustrated in FIG. 6, wherein the electrode 14''' is formed to have a hollow interior to receive the main body portion of a tube 60', the distal end of which is provided with an outwardly flanged section 62'. The upper surface of the flanged section 62 is adapted to rest against the under surface of the sheet 64', while the lower surface thereof rests against the upper terminal end of the electrode 16'''. The upper surface of the sheet 64' rests against the under surface of the electrode 14'''. It will be noted that an insulating sleeve 66 is disposed about the outer peripheral surface of the tube 60' between the inner surface of the hollow electrode 14'''. In the arrangement illustrated in FIG. 7, the current path through the parts being welded; namely, the flange portion 62' of the tube 60', and the apertured sheet 64', is concentrated and typically flows through the zone defined by the contact area between the upper surface of the flanged portion 62', and the overlapped lower portion of the under surface of the apertured sheet 64'.

More specifically, the current flows between the electrodes 14''' and 16''' through the inner marginal edge portion of the apertured sheet 64', and the adjacent portion of the flanged portion 62' of the tube 60'. It will be appreciated that the weld between the parts being welded the system illustrated in FIG. 2 is employed as in the other modifications which have been described hereinbefore.

Figure 8:
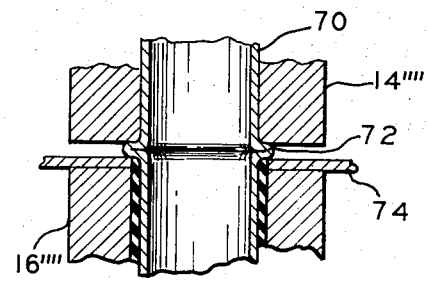
FIG. 8 is a fragmentary elevational view partly in section of a modified form of the invention wherein a tube having a centrally disposed flange is welded to an associated apertured sheet member to form an integral unitary article.

In FIG. 8, there is illustrated an article formed of a tube 70 and an apertured sheet 74, wherein the weld is effected at the faying interface between the sheet 74 and the annular flange 72 formed in the wall of the tube 70 by a crimping operation. The electrodes 14'''' and 16''' are similar to the electrodes discussed with respect to the earlier modifications, with the exception that the lower electrode 16'''' is apertured to receive the lower portion of the tube 70 during the welding operation. It will be understood that the force pulse and the electrical energy pulse are applied to the electrodes and the attendant assemblage of parts by the system illustrated in FIG. 2 to thereby effectively form a unitary structure.

Figure 9:
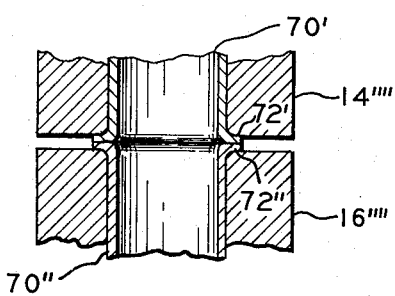
FIG. 9 is a fragmentary elevational view partly in section showing an arrangement for welding two tubes into an integral unitary structure wherein the individual tube elements have flange portions to provide the desired faying interface therebetween to be welded together.

FIG. 9 shows an article formed of two sections of tubing which are formed into a unitary structure by the electrode arrangement illustrated in FIG. 8. More specifically, the upper tube section 70' is provided with a lower flanged section 72', while the lower tube section 70'' is provided with an upper flanged section 72''. After being suitably positioned in the respective electrodes 14'''' and 16'''', the flanged portions 72' and 72'' of the tube sections 70' and 70'', respectively, are in overlapped relation. As in the other modifications of the invention described herein above, the force pulse and the electrical energy pulse are applied to the electrodes and the assemblage of parts by the system illustrated in FIG. 2.

It will be understood by those skilled in the art that the above described invention produces a unitary structure formed of at least a pair of cooperating overlapped parts of electrically conductive material wherein, in each instance, the weld is formed in the zone defined by the overlapped portion of the parts. Thereby, the electrical path through the parts being welded is well defined and contribute to the minimization of heat energy buildup in the weld zone to effectively prevent any crystalline deformation of the internal structure of the metal being welded. The novel unitary structures of the invention and the method of forming the structures is of a substantial consequence to the field of welding and enables the production of parts heretofore impossible to achieve.

In accordance with the provisions of the patent statutes, I have explained the principal and mode of operation of my invention and have illustrated and described what I now consider to represent its best embodiments. However, I desire to have it understood that the invention may be practiced otherwise than as specifically illustrated and described without departing from its spirit or scope.

What I claim is:

1. A method of welding two parts of electrically conducting material comprising:
    providing a first surface of one of said parts;
    providing a second surface of the other of said parts conformable with said first surface of said parts;
    engaging said first and second surfaces over a narrow elongate region;
    providing a pair of opposed cooperating electrodes, both of said electrodes having an engaging surface dimension equal at least to the length of the faying interface of said first and second surfaces desired to be welded;
    imposing a force pulse on the faying interface between said first and second surfaces to urge said surfaces into intimate contact; and
    applying an electrical energy pulse of from 0.5 to 5.5 milliseconds duration between said electrodes to produce a current density within the range of from 500,000 to 3,000,000 amperes per square inch of faying interface between said first and said second surfaces desired to be welded in overlapping time phased relation with said force pulse to weld said surfaces together to form an integral bonded article.

2. The method as defined in claim 1 wherein said electrical energy pulse is applied as a single pulse.

3. The method defined in claim 1 wherein the force pulse applied to said parts arrives at its peak amplitude before the electrical energy pulse arrives at its peak magnitude.

4. The method as defined in claim 1 wherein said parts are metal sheets.

5. The method as defined in claim 4 wherein said force pulse is effective to mash said sheets into a planar article.

6. The method as defined in claim 4 wherein at least one of said sheets is of the order of 0.05 inch in thickness.

* * * * *